United States Patent [19]
Weichel

[11] 4,324,295
[45] Apr. 13, 1982

[54] AGRICULTURAL IMPLEMENT ATTACHABLE TO A TRACTOR

[76] Inventor: Ernst Weichel, Bahnhofstr. 1, D 7326 Heiningen, Fed. Rep. of Germany

[21] Appl. No.: 967,873

[22] Filed: Dec. 8, 1978

[30] Foreign Application Priority Data

Dec. 14, 1977 [DE] Fed. Rep. of Germany ....... 2755676

[51] Int. Cl.³ .............................................. A01B 49/04
[52] U.S. Cl. ...................................... 172/28; 172/70; 172/112; 111/1
[58] Field of Search .................... 47/9; 111/1; 172/28, 172/29, 70, 112, 123, 63, 47, 45, 49, 50, 51, 52, 48; 56/504, 192

[56] References Cited

U.S. PATENT DOCUMENTS

| | | | |
|---|---|---|---|
| 769,446 | 9/1904 | McFadden | 172/63 |
| 2,312,164 | 2/1943 | Holzbock | 172/112 |
| 2,936,838 | 5/1960 | Bonomo | 172/28 |
| 2,974,472 | 3/1961 | Gebhart | 56/504 |
| 3,011,793 | 12/1961 | McElhinney | 172/112 |
| 3,770,064 | 11/1973 | Scarnato | 47/9 |
| 3,880,099 | 4/1975 | Houston | 111/1 |
| 3,913,502 | 10/1975 | Richey | 111/1 |
| 3,931,858 | 1/1976 | North | 172/47 |
| 3,977,476 | 8/1976 | Lely | 172/47 |
| 4,078,626 | 3/1978 | Weichel | 111/1 |

FOREIGN PATENT DOCUMENTS

| | | | |
|---|---|---|---|
| 2506223 | 8/1976 | Fed. Rep. of Germany | 172/49 |
| 103704 | 12/1962 | Netherlands | 172/45 |
| 492 | of 1907 | United Kingdom | 172/52 |

OTHER PUBLICATIONS

Landtechnik No. 6 pp. 272-276 Jun. 1975.

*Primary Examiner*—Richard J. Johnson
*Attorney, Agent, or Firm*—Toren, McGeady & Stanger

[57] ABSTRACT

An agricultural implement is arranged to be connected to a tractor so that it can be pulled over a field covered with organic material, such as live or dead plants or harvesting residues. The implement includes a main support frame followed by an auxiliary support frame. A flail-blade cylinder is dependently supported from the main frame for comminuting the organic material. Arms are mounted on the main frame rearwardly of the cylinder for loosening the soil. On the auxiliary support frame, a device is mounted for breaking up clods of loosened soil. A hood is positioned over the cylinder with a selectively adjustable rear part for directing the flow of the comminuted organic material thrown rearwardly by the cylinder. Other material directing or conveying members can be used in combination with the hood for facilitating the movement of the comminuted material rearwardly from the cylinder.

13 Claims, 10 Drawing Figures

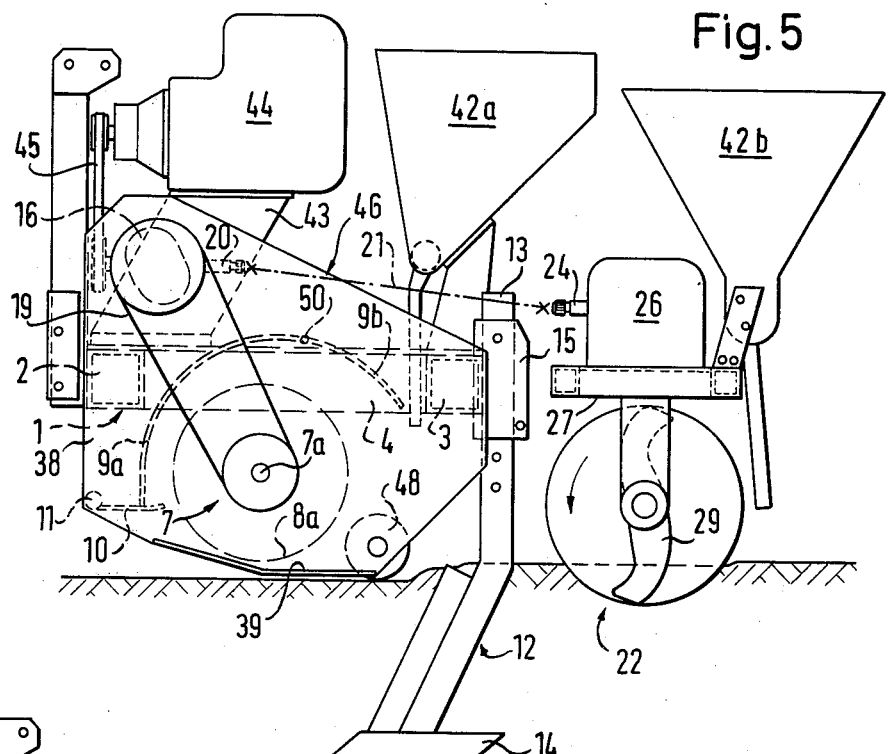
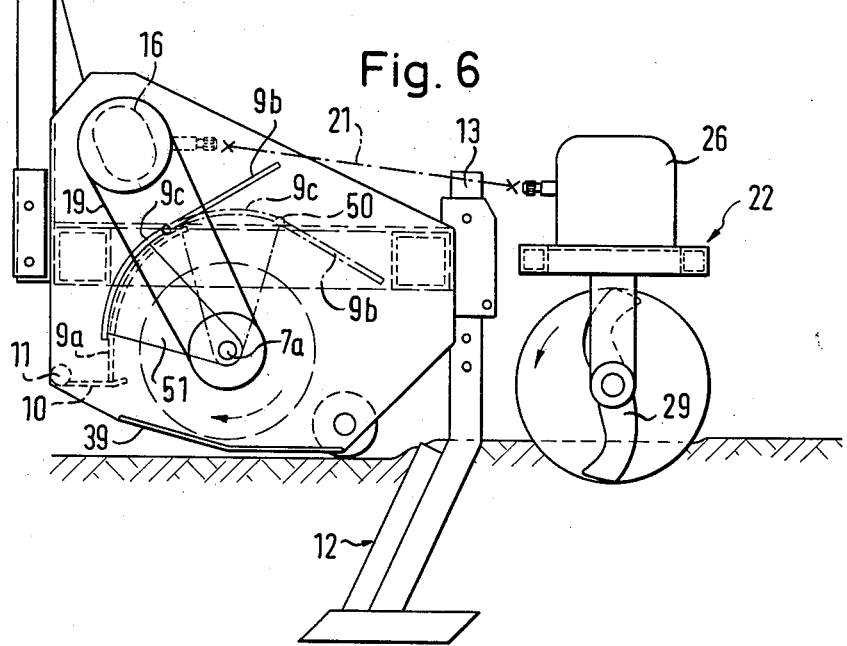

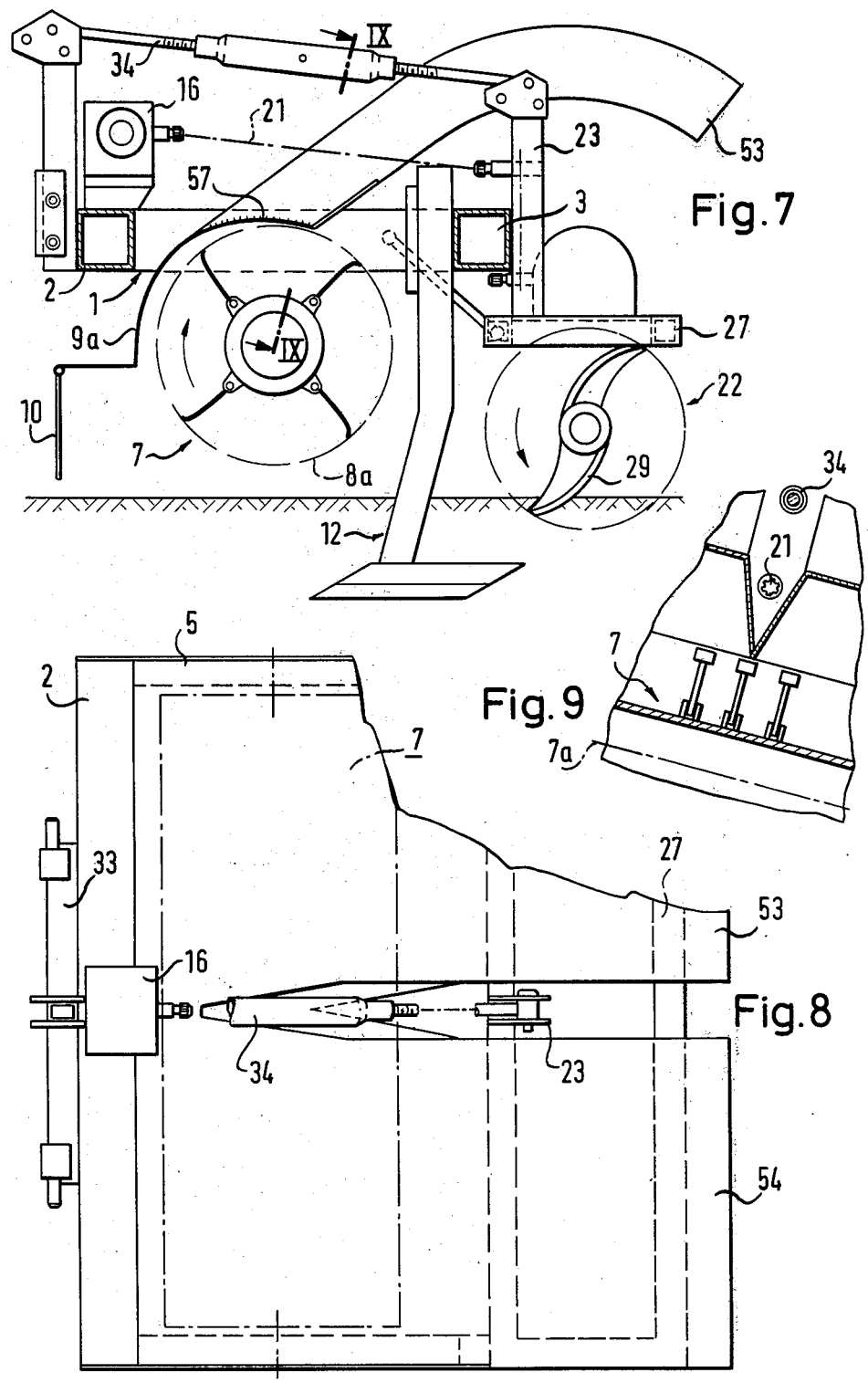

AGRICULTURAL IMPLEMENT ATTACHABLE TO A TRACTOR

SUMMARY OF THE INVENTION

The present invention is directed to an agricultural implement attachable to a tractor for movement over tillable land covered with organic material such as live or dead plants or harvesting residues. The implement includes at least one driven flail-blade cylinder located under a hood and forwardly of a transverse row of soil loosening members. Rearwardly of the soil loosening members, a driven rotating tool is positioned for breaking up clods of loosened soil. The flail-blade cylinder picks up the organic material covering the soil, comminutes the material and throws it rearwardly so that it is mixed with the loosened soil or affords a cover for the soil after it is loosened and any clods are broken up.

A known embodiment of such a implement is disclosed in the magazine "Landtechnik" (Agriculural Engineering), No. 6, mid-June 1975, pages 272–276, but it has the disadvantage that its overall length is too great. Its length feature makes lifting of the combination implement by a tractor more difficult and, in addition, requires a higher power rating because the flail-blade cylinder is supposed to throw the organic material covering the soil rearwardly beyond the loosening members into a "mixing zone".

While it is possible to cast materials having a low specific weight in the rearward direction, for example, dry straw, in the case of materials having a high specific weight, for example, moist straw, green manure, leaves of beets or turnips, and particularly when such material is mixed with farmyard manure, there is a tendency for such materials to stick together requiring excessive power and resulting in a non-uniform mixing of the organic material into the soil.

Further, this known embodiment has the disadvantage that additional tools for breaking up clods of loosened soil can only be used when the cover of organic material is mixed into the soil layer through which the tool moves for breaking the clods of soil. Mixing the organic material into the top soil layer is appropriate only when the material can be left to itself for a certain period of time prior to the next sowing or planting so that the organic material has an opportunity to rot.

If, however, the field covered with live or dead plants or harvesting residues is to be tilled immediately after it is loosened in preparation for planting, so that, for example, after the harvest of grain manure or green manure or after the harvest of a crop of green manure, a principal crop, such as grain, potatoes, sugar beet, can be planted, it is especially disadvantageous to mix a great amount of the organic material into the soil. In such a situation, due to the aerobic digestion of the organic material in the soil, for a certain period root poisons are created which are harmful to or may even prevent the germination and growth of seed. Accordingly, if a field is covered with large amounts of straw, green manure and the like, it is better to mix only a small portion of such organic material into the soil when it is loosened and tilled, and to place the remaining portion, possibly mixed with a small amount of soil, as a so-called mulch cover over the surface of the previously prepared soil.

Another disadvantage of the known implement is that the placement of additional devices for the application of fertilizer, manure or seed is not possible or can be effected only after expensive conversions to the drive units or the mounting members.

Therefore, the primary object of the present invention is to provide an implement which avoids the disadvantages set forth above. In particular, the invention is directed to an agricultural implement attachable to a tractor for use in loosening tillable soil which is covered with organic material, such as live or dead plants or harvesting residues, with the implement having a short overall length and a low power requirement. Further, the implement permits covering the soil with organic material as a mulch cover after the soil has been loosened and tilled. The implement is adjustable for selectively determining the portion of the organic material to be used in a particular manner. Moreover, the arrangement of the implement affords the simple mounting of additional devices for applying fertilizer, manure or seed.

In accordance with the present invention, the material comminuted by the flail-blade cylinder is directed rearwardly by a hood arranged over the cylinder. The hood is adjustable so that the comminuted material can be directed obliquely downwardly and rearwardly in front of the members loosening the soil or it can be cast further rearwardly onto the soil after it has been tilled, and any clods in the loosened soil have been broken up.

The members used for loosening the soil are downwardly extending legs each having a cutting edge on its forward surface with a portion of the cutting edge constructed in the form of a concave circular segment projecting forwardly so that the concave circular portion is located a short distance rearwardly from the path of travel of the radially outer ends of the flail-blades.

In a preferred embodiment of the implement, the hood over the flail-blade cylinder consists of two parts, a front part extending concentrically to the axis of the cylinder extends around the upper portion of the cylinder and a rear part in the form of a flap is hinged to the front part and can be adjustably positioned and/or removed for selectively directing the flow of material from the cylinder.

In this hood arrangement, it is advantageous to hinge the flap above and forwardly of the axis of rotation of the flail-blade cylinder so that the flap can be positioned to throw the organic material rearwardly beyond the support frame for the cylinder and members which loosen the soil and, additionally, beyond the tool for tilling the soil. In another position, however, the flap can be adjusted to cast the material downwardly below the support frame and between the members loosening the soil in front of the tilling tool.

Another feature of the invention is the provision of a known rectangular support frame for the flail-blade cylinder and the soil loosening members which frame consists of two spaced support tubes extending transversely of the travel direction of the implement and at least two spaced support tubes extending in the travel direction and interconnecting the other two tubes. A headstock extends upwardly from the front support tube and is connected to the power lift device of the tractor. In addition, distributor gearing is also located on the front support tube and includes a lateral power take-off shaft and a rear power take-off shaft. The flail-blade cylinder is driven by a belt gearing connected to the lateral power take-off shaft. Another support frame for a tilling tool can be located rearwardly of the main support frame and can be driven by the rear power take-off shaft via a universal joint shaft.

It is advantageous to hinge the auxiliary support frame, mounting the tilling tool to the main support frame, by link rods. Additionally, the auxiliary frame is supported from the main frame by two spindles for adjusting its position. The headstock on the main frame can be connected to the headstock for the tool on the auxiliary frame by a longitudinally adjustable connecting strut.

In another embodiment the auxiliary frame can be rigidly, but vertically adjustably connected to the front frame.

In a similar embodiment the auxiliary frame supporting the tilling tool is hinged, by means of a pair of drawbars rigidly connected to the auxiliary frame, to pivots located on the main frame and its vertical position can be adjusted through spindles or stops.

In yet another embodiment of the invention, the portions of the main support frame extending in the direction of travel of the tractor are connected to end walls which, in combination with the hood over the flail-blade cylinder, form a known housing enclosing the front, top and sides of the cylinder. In the working position this housing is supported on the ground surface through feeler wheels or rollers and/or through additional skids. These support members are preferably vertically adjustable.

In an advantageous arrangement of the hood over the flail-blade cylinder, the front part of the hood is formed of two parts, a forward portion and a rearward portion, with the rearward portion arranged concentrically to the axis of rotation of the cylinder and being telescopically slidable over the forward portion so that it can be locked in at least two different positions.

In still another embodiment of the hood, a pair of chutes can be arranged in side-by-side arrangement extending rearwardly from the hood at a position closely adjacent the radially outer travel path of the flail-blades and with the chutes extending rearwardly first in the upper direction and then in the downward direction over the soil loosening and tilling tools. The chutes are spaced laterally from one another so that the universal joint shaft or connecting rods associated with the implement can extend rearwardly between the chutes.

Another feature of the invention is that the implement can be equipped with additional known devices for introducing fertilizer, manure or seed into the loosened soil which is covered with the organic material.

Finally, the invention includes the provision of fastening devices on the support frame for mounting an additional motor with power transmission means for separately driving the flail-blade cylinder and/or the rotatable soil working tools.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing

FIG. 5 is still another embodiment of the implement illustrated in FIG. 1 supplemented with additional features;

FIG. 6 is a side view similar to FIG. 5 exhibiting yet another embodiment of the implement;

FIG. 7 is a side view displaying a further modified embodiment of the implement disclosed in FIG. 1;

FIG. 8 is a top view of the embodiment shown in FIG. 7; and

FIG. 9 is a partial sectional view taken along the line IX—IX in FIG. 7.

DETAILED DESCRIPTION OF THE INVENTION

Figure 1:
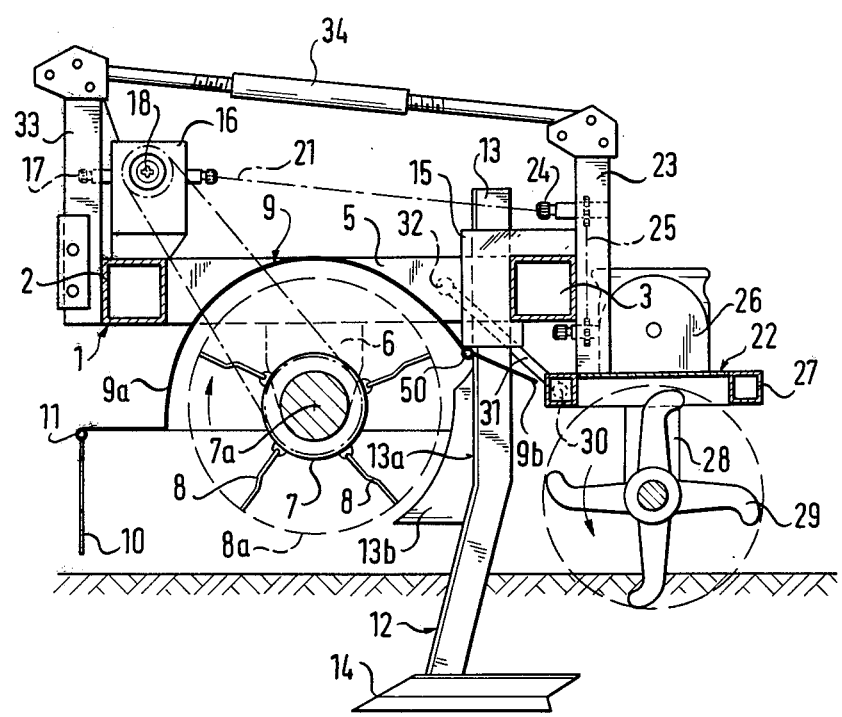
FIG. 1 is a schematic side view, partly in section, of an implement embodying the present invention.

In FIG. 1 an agricultural implement is shown for attachment to a tractor with the forward end of the implement located at the left-hand side of the Figure and its rearward end at the right-hand side.

Figure 2:
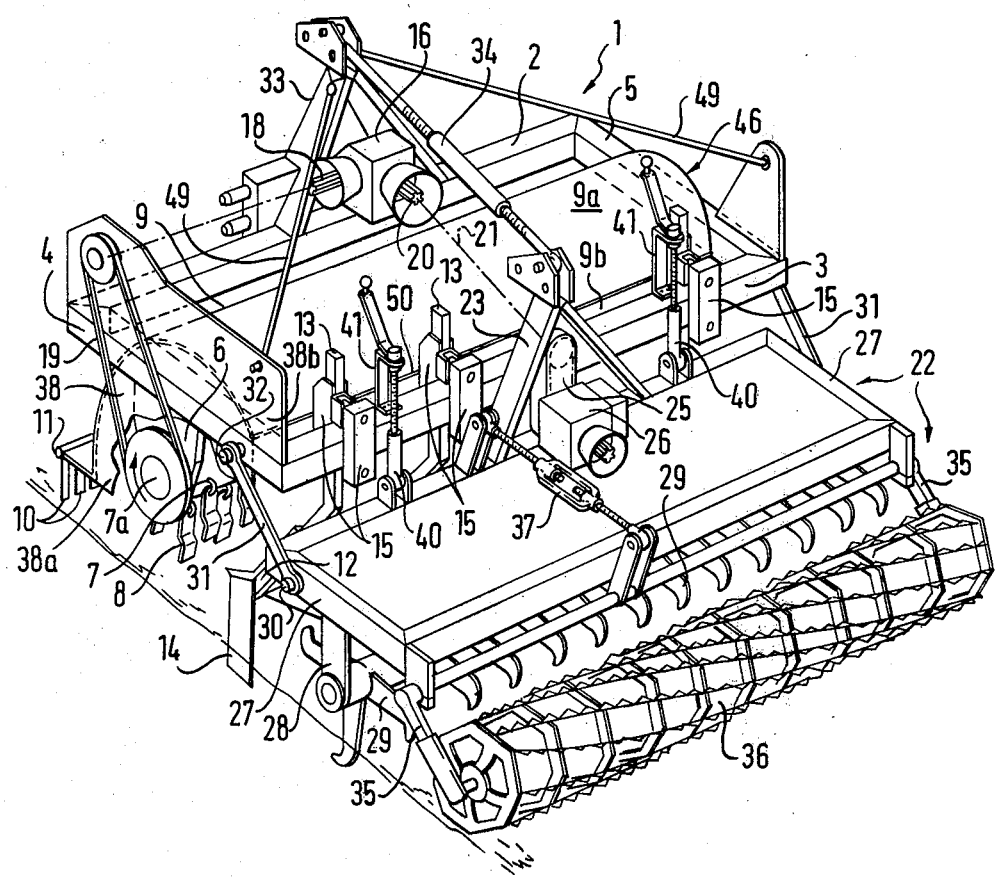
FIG. 2 is a perspective view, looking from the rear, of the implement illustrated in FIG. 1 and showing additional details.

As can be seen in FIGS. 1 and 2, the implement includes a rectangularly shaped main support frame 1 consisting of a front end support tube 2, a rear end support tube 3 spaced rearwardly from and parallel to the front end support tube, and a pair of laterally spaced side tubes 4, 5 interconnecting the front and rear end tubes.

Bearing brackets 6 are attached to the undersurface of the side support tubes 4, 5 for supporting bearings, not shown, of a flail-blade cylinder 7. Flail-blades 8 extend radially outwardly in a number of rows circumferentially spaced around the cylinder with the blades in each row extending transversely across the main support frame 1 between the side supports. The cylinder 7 rotates about an axis 7a and the radially outer ends of the flail-blades 8 travel along a circular path 8a radially outwardly from the cylinder.

A hood 9 provides a cover over the upper portion of the flail-blade cylinder 7 and the radially outer travel path 8a of the flail-blades 8 is located closely inwardly from the hood. The hood consists of a front part 9a rigidly connected to the main support frame 1 and a flap 9b is hinged to the rearward edge of the front part and can be locked in selected positions. From its lower edge adjacent the travel path 8a of the flail-blades 8, the front part 9a of the hood 9 extends forwardly and a stone guard 10 is attached by a hinge 11 to its forward end. The stone guard 10 is a known element and extends downwardly in front of the lower portion of the flail-blade cylinder.

Several supports 15 are spaced across the rear end support tube 3 and they secure vertically adjustable legs 13 of known soil loosening members 12. Loosening shares 14 are located at the lower ends of the legs 13 and have a V-shaped configuration. As can be seen in FIG.

1 the shares extend forwardly and rearwardly from the lower end of the legs 13. The dimensions of the shares 14 make it possible to space the legs 13 a significant distance apart, since they effect a loosening of the soil, without any gaps, in a known manner in the region between adjacent legs 13. The forward edge 13a of the legs 13, note FIG. 1, provide a known cutting edge, however, a projection 13b extends forwardly from the cutting edge and the projection has a concave circular portion located a small distance outwardly from the travel path 8a of the flail-blades. Because of this projection 13b, material passing around the flail-blade cylinder which is sticky or not comminuted cannot settle at the forward cutting edge 13a of the legs 13.

Secured to and extending upwardly from the front end support tube 2 is a known headstock 33 for a known power lift device, not shown, of a tractor. Diagonal struts 49, note FIG. 2, connect the headstock 33 to the rear end support tube 3.

Distributor gearing 16 is positioned on the front end support tube 2 behind the headstock 33. A forwardly facing power input shaft 17 of the distributor gearing 16 can be connected to the power take-off shaft of the tractor through a universal joint shaft, now shown. A lateral power take-off shaft 18 of the distributor gearing 16 extends laterally over the front end support 2 and a belt-gearing 19 is connected to this shaft along the side of the main support frame. The belt gearing 19 drives the flail-blade cylinder 7 in the direction of the arrow shown in FIGS. 1 and 2. A rear power take-off shaft of the distributor gearing 16 is connected over a universal joint shaft 21, indicated by dotted lines in FIGS. 1, 2 and 2a, to an input shaft 24 of gearing 25, note FIGS. 1 and 2 or gearing 26, note FIG. 2a. The gearing 26 is a part of an auxiliary implement 22 for tilling soil, such as a known rotary harrow or rotary cultivator. This auxiliary implement 22 has a separate known frame 27 which, through brackets 28, supports a driven shaft provided with teeth or tines 29.

Figure 2A:
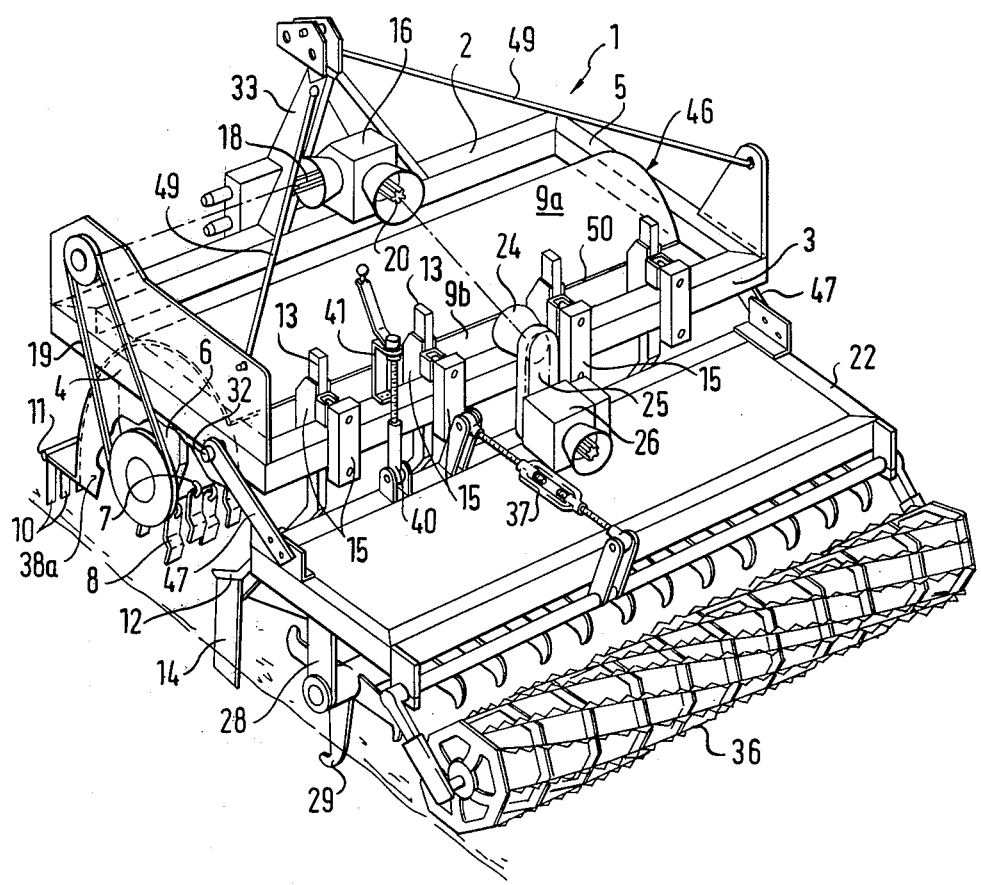
FIG. 2a is a view similar to FIG. 2 of a slightly different embodiment of the implement.

While the illustrated embodiment in FIGS. 1, 2 and 2a shows tines 29 extending radially outwardly from a driven shaft which, in turn, extends transversely of the travel direction, it would be possible to use rotary harrows each mounted on a shaft extending vertically relative to the ground surface and each provided with downwardly extending tines.

As can be seen in FIGS. 1 and 2, the auxiliary frame 27 of the implement 22 is connected by a pair of links 31 to pivot points 30 at the forward side surfaces of the auxiliary frame and to pivot points 32 at the rear ends of the side supports 4, 5 of the main support frame 1 so that the auxiliary frame is not only vertically adjustable about the axes of rotations formed by the pivot points 30, 32 which extend transversely of the travel direction, but in addition the auxiliary frame can be tilted about an imaginary axis of rotation, not shown, which extends in the travel direction.

Accordingly, the shaft carrying tines 29 can be adjusted to any unevenness or slope of the ground over which the agricultural implement is being pulled. The lowest position of the auxiliary frame 27 relative to the main frame 1 is provided by adjusting spindles 40 mounted in stops 41 on the rear end support tube 3 so that the auxiliary frame 27 is freely movable in the vertical direction.

By means of a connecting rod 34, headstock 23 of the auxiliary implement 22 is connected to headstock 33 so that the auxiliary frame is always supported on a roller 36 for breaking clods of loosened soil. The roller 36 is pivotally mounted on the rear end of the frame 27 through pivots 35 and can be pivoted and locked by means of an adjusting spindle 37. Accordingly, it is possible to control exactly the depth to which the tines 29 extend into the soil being worked.

As illustrated in FIG. 2a, it is possible to connect the auxiliary frame 27 to the pivot points 32 on the main frame 1 through a pair of draw bars 47 rigidly connected to the auxiliary frame. Accordingly, the auxiliary frame 27 is vertically adjustable only about the horizontal axis through the pivot points 32 which axis extends transversely of the travel direction and its vertical position can be established by an adjusting spindle 40 mounted on the rear end support 3 in a stop 41.

As displayed in FIGS. 5 and 6, the main frame 1 rests on the ground surface via skids 39 located at the lower end of a lateral housing wall 38 or on a feeler roller 48 rotatably mounted on the rear portion of the housing wall 38. These support elements are known. In its working position, the implement mounted on the main support frame 1 rests on the ground with the soil loosened shares 14 extending downwardly into the soil for an adjusted depth so that they lift and deposit the soil in a coarsely loosened state. As illustrated in FIGS. 2 and 5, the front part 9a of the hood 9 together with the lateral housing walls 38 which are rigidly connected to the main frame 1, form a housing 46. Housing 46 encloses the front, top and sides of the flail-blade cylinder 7. Flap 9b hinged to the rear edge of the front part 9a influences the manner in which the material is thrown or cast rearwardly from the flail-blade cylinder 7.

In addition, in accordance with the invention, it is possible to form the front part 9a of the hood 9 with a telescopically movable rearward part 9c. As can be seen in FIG. 6, the rearward part 9c is telescopically slidable over the forward part of front part 9a via swivel arms 51 mounted concentrically to the axis of rotation 7a of the cylinder. The telescopically slidable rearward part 9c can be moved between and locked in two different positions.

In FIG. 6 the telescopically slidable rearward part 9c is shown in one position in solid lines moved forwardly over the forward portion of the front part 9a of the hood so that material from the flail-blade cylinder 7 is conveyed obliquely upwardly to the rear over the upper ends of legs 13 and the gearing 26 of the implement 22 whereby the organic material picked up by the flail-blades 8 falls onto the soil which has been loosened by the shares 14 and broken up by the tines 29 and, thus, affords a mulch cover. Any of the organic material not picked up by the flail-blades 8, for example, stubbles of straw or green manure including the roots of plants, is mixed into the top soil layer by the tines 29.

Further in FIG. 6, another position of the telescopically slidable part 9c is shown in dotted lines, that is, with the part 9c extending rearwardly from the forward portion of the front part 9a of the hood so that the organic material picked up by the flail-blades 8 is thrown downwardly below the rear end support tube 3 and between the legs 13 onto the soil which has been coarsely loosened by the shares 14 or rearwardly in front of the tines 29 so that the material is completely mixed into the soil.

In this arrangement, the rearward movement of the organic material is not hindered by the connecting strut 34 or the universal joint shaft 21 extending down the middle of the implement, nor by any other devices mounted on the main frame for spreading fertilizer or seed.

Figure 3:
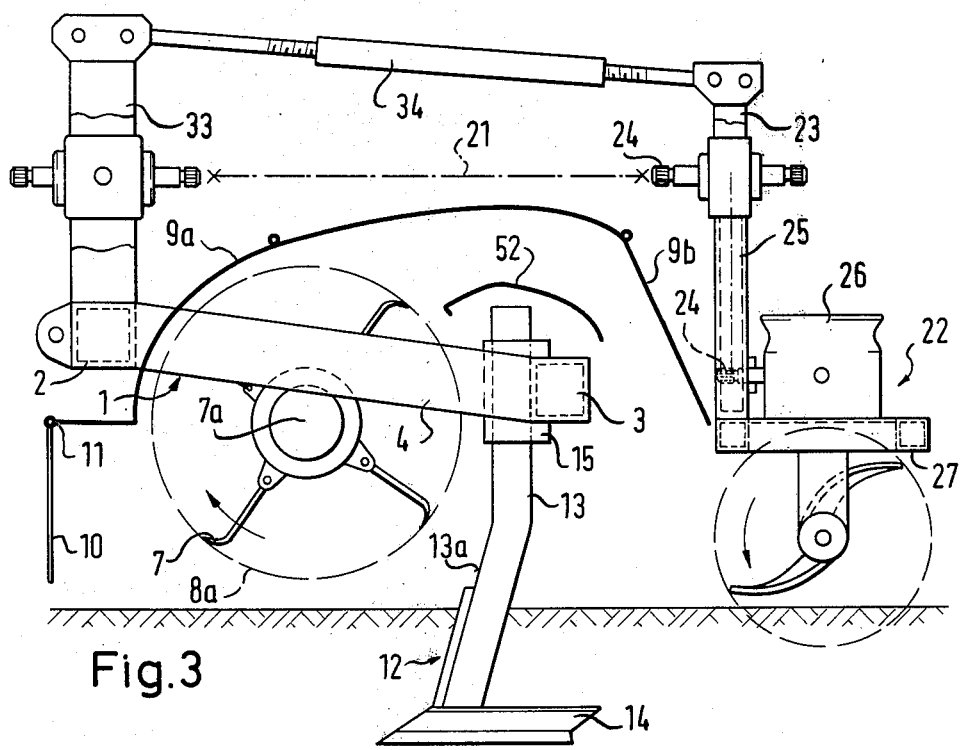
FIG. 3 is a view, similar to FIG. 1, showing another embodiment of the implement.

However, if the organic material is to be cast over the upper ends of the legs 13 onto the soil rearwardly of the loosening members 12, but forwardly of the implement 22, note FIG. 3, the universal shaft 21 along with the gearing 25 and the connecting strut betwen the headstocks 23, 33, must be positioned at a height so that the space for locating the front hood part 9a, its flap 9b and, possibly, a lower chute wall 52, is provided.

Figure 4:
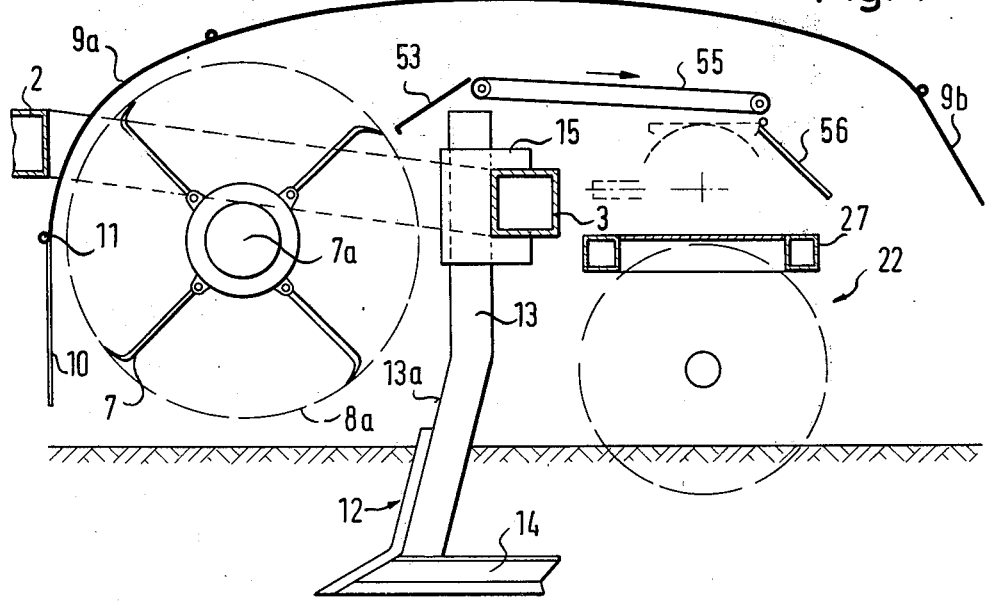
FIG. 4 is a view similar to FIG. 3 illustrating another modification of the implement shown in FIG. 1.

If, however, the organic material is to be thrown rearwardly beyond the legs 13 and the implement 22, it is necessary, as shown in FIG. 4, to shift the headstock 23 and the shaft 21 toward the lateral border of the frames 1, 27 in a known manner but not shown in detail. As an alternative, the headstock 23 can be removed in accordance with the arrangement in FIG. 2a. To avoid such a rearrangement, the invention proposes, in accordance with FIG. 7, to provide a chute-like member extending rearwardly from the crown of the flail-blade cylinder 7. The chute-like arrangement, note FIGS. 7 and 8, includes a pair of chutes 53, 54 extending in side-by-side relation from the front part 9a of the hood at the crown of the cylinder 7, that is approximately directly above the high point of the cylinder. The inlet into the chutes is designated by reference numeral 57. Material picked up by the flail-blade cylinder 7 moves upwardly under the hood 9 and through the inlet 57 into the two chutes 53, 54. The chutes 53, 54 are spaced laterally apart, note FIGS. 8 and 9, at a position rearwardly from the inlet 57 so that a space is provided through which the universal joint shaft 21 and the connecting strut 34 can pass.

In the situation where the range of the flail-blade cylinder 7 is not sufficient for effectively casting moist or green organic material to a desired location, it is possible that the material could settle on the chute wall 52 or could block the chutes 53, 54. Accordingly, the invention also affords the replacement of the chute wall 52 as shown in FIG. 3, with a belt conveyor 55 illustrated in FIG. 4. The belt conveyor 55 extends approximately horizontally and can be driven in a known manner, not shown, at a low conveying speed. Further, an obliquely downwardly extending chute is arranged at the trailing end of the belt conveyor for directing the organic material as it leaves the conveyor. This horizontal belt conveyor 55 facilitates the handling of large amounts of moist or sticky material having a high specific weight when the flail-blade cylinder has a relatively low rate of rotation and the lowest power requirement.

In FIG. 5 the main support frame 1 is provided with fastening devices 43, such as brackets, for supporting a motor 44 which, independently of the tractor, can drive the distributor gearing 16 and/or the gearing 26 through known power transmission devices 45.

In still another feature of the invention, a fertilizer distributor 42a can be mounted on the main support frame 1, if needed, and another device 42b can be mounted on the auxiliary support frame 27 for sowing seed. In this arrangement, as shown in FIG. 5, the flail-blade cylinder 7 casts the organic material downwardly beneath the rear end support tube 3.

As a result, it is possible in a single operation to carry out all of the necessary working steps for cultivating a field, such steps including the comminuting of any previous crops, harvesting residues and the like, loosening the soil, breaking up any clods of the soil, fertilizing and drilling.

While specific embodiments of the invention have been shown and described in detail to illustrate the application of the inventive principles, it will be understood that the invention may be embodied otherwise without departing from such principles.

What is claimed is:

1. Agricultural implement arranged to be attached to a tractor for movement in the forward direction over a field and used for loosening tillable soil covered with organic material such as live or dead plants or harvesting residue, said implement comprises a main support frame having a front end support and a rear end support spaced from the front end support in the direction opposite to the forward direction of movement of said implement, and a pair of laterally spaced side supports extending between said front and rear end supports, an axially extending flail-blade cylinder dependently supported on and extending across said frame between said side supports, said flail-blade cylinder including a plurality of flail-blades arranged around the circumference of said cylinder and along the axial direction thereof, means for driving said cylinder, means for covering at least the upper portion of said cylinder, means for loosening soil mounted on and extending downwardly from said main support frame rearwardly of said cylinder, support means located rearwardly of said means for loosening the soil, means for breaking up clods of loosened soil mounted on said support means rearwardly of said means for loosening soil, said flail-blade cylinder arranged to pick up organic material covering the ground, to comminute the material and to throw it in the rearward direction onto the loosened soil over which the implement passes, wherein the improvement comprises that said means for covering said cylinder comprises a covering hood extending around the upper portion of said cylinder between said side supports from the front side of the cylinder toward the rear side thereof with the rear end of said hood arranged for selectively directing in the rearward direction the material acted on by the cylinder, a headstock for the power lift of the tractor is secured to and extends upwardly from said front end support, distributor gear means mounted on said front end support for driving at least said flail-blade cylinder and including a lateral power take-off shaft and a rear power take-off shaft, a belt drive mounted on said power take-off shaft and said cylinder for driving said cylinder, and said means for breaking up clods of loosened soil is connected to said rear take-off shaft and is driven thereby, said support means located rearwardly of said means for loosening soil comprises an auxiliary support frame supporting said means for breaking up clods of loosened soil, links connecting said auxiliary support frame to said main support frame, adjustable spindles mounted on said main support frame and connected to said auxiliary support frame for pivotally adjusting the position of said auxiliary support frame in the vertical direction, a headstock secured to and extending upwardly from said auxiliary support frame, and an adjustable connecting strut interconnecting said headstock on said main support frame to said headstock on said auxiliary support frame.

2. Agricultural implement, as set forth in claim 1, wherein said links are povitally connected to said main support frame and said auxiliary support frame.

3. Agricultural implement, arranged to be attached to a tractor for movement in the forward direction over a field and used for loosening tillable soil covered with organic material such as live or dead plants or harvesting residue, said implement comprises a main support frame having a front end support and a rear end support spaced from the front end support in the direction opposite to the forward direction of movement of said implement, and a pair of laterally spaced side supports extending between said front and rear end supports, an axially extending flail-blade cylinder dependently supported on and extending across said frame between said side supports, said flail-blade cylinder including a plurality of flail-blades arranged around the circumference of said cylinder and along the axial direction thereof, means for driving said cylinder, means for covering at least the upper portion of said cylinder, means for loosening soil mounted on and extending downwardly from said main support frame rearwardly of said cylinder, support means located rearwardly of said means for loosening the soil, means for breaking up clods of loosened soil mounted on said support means rearwardly of said means for loosening soil, said flail-blade cylinder arranged to pick up organic material covering the ground, to comminute the material and to throw it in the rearward direction onto the loosened soil over which the implement passes, wherein the improvement comprises that said means for covering said cylinder comprises a covering hood extending around the upper portion of said cylinder between said side supports from the front side of the cylinder toward the rear side thereof with the rear end of said hood arranged for selectively directing in the rearward direction the material acted on by the cylinder, said support means located rearwardly of said means for loosening soil comprises an auxiliary support frame supporting said means for breaking up clods of loosening soil, links pivotally connected to said main support frame and rigidly connected to said auxiliary support frame, adjustable spindles mounted on said main support frame and connected to said auxiliary support frame for adjustably supporting said auxiliary support frame for movement in the vertical direction relative to said main support frame.

4. Agricultural implement, arranged to be attached to a tractor for movement in the forward direction over a field and used for loosening tillable soil covered with organic material such as live or dead plants or harvesting residue, said implement comprises a main support frame having a front end support and a rear end support spaced from the front end support in the direction opposite to the forward direction of movement of said implement, and a pair of laterally spaced side supports extending between said front and rear end supports, an axially extending flail-blade cylinder dependently supported on and extending across said frame between said side supports, said flail-blade cylinder including a plurality of flail-blades arranged around the circumference of said cylinder and along the axial direction thereof, the axis of said cylinder is substantially horizontal and said cylinder is divided by a horizontal plane including the axis thereof into an upper portion and a lower portion, means for driving said cylinder, means for covering at least the upper portion of said cylinder, means for loosening soil mounted on and extending downwardly from said main support frame rearwardly of said cylinder, support means located rearwardly of said means for loosening the soil, means for breaking up clods of loosened soil mounted on said support means rearwardly of said means for loosening soil, said flail-blade cylinder arranged to pick up organic material covering the ground, to comminute the material and to throw it in the rearward direction onto the loosened soil over which the implement passes, wherein the improvement comprises that said means for covering said cylinder comprises a covering hood extending around the upper portion of said cylinder between said side supports from forwardly of the front side of the cylinder toward the rear side thereof with the rear end of said hood terminating in front of said rear end support with said covering hood extending so that in combination with said flail-blade cylinder the organic material located between said hood and cylinder is conveyed along a path oblique to the surface over which the implement travels, said covering hood comprising an arcuately shaped front part approximately concentrically arranged relative to the axis of said cylinder and rigidly connected to said main support frame, and a rear part hinged to the rear end of said front part and extending rearwardly therefrom and being in the form of a flap, said rear part is movable relative to said main support frame, said rear part being adjustably positionable around the hinge connection with said front part and being lockable in the adjusted positions for selectively directing in the rearward direction relative to said means for loosening soil and to said means for breaking up clods of loosened soil the organic material acted on by said cylinder, said main support being rectangularly shaped, said front end support of said main support frame supporting a headstock for a power lift device on a tractor, said headstock including a gearing with at least one lateral and one rear power take-off shaft, said cylinder being driven by said lateral power take-off shaft and said means for breaking up the soil being driven by said rear power take-off shaft, said means for breaking up the soil including a frame, links hingedly connecting said frame to said main support frame adjustable spindles supporting said frame in the vertical direction and a longitudinally adjustable diagonal strut connected to the frame and to said headstock.

5. Agricultural implement arranged to be attached to a tractor for movement in the forward direction over a field and used for loosening tillable soil covered with organic material such as live or dead plants or harvesting residue, said implement comprises a main support frame having a front end support and a rear end support spaced from the front end support in the direction opposite to the forward direction of movement of said implement, and a pair of laterally spaced side supports extending between said front and rear end supports, an axially extending flail-blade cylinder dependently supported on and extending across said frame between said side supports, said flail-blade cylinder including a plurality of flail-blades arranged around the circumference of said cylinder and along the axial direction thereof, the axis of said cylinder is substantially horizontal and said cylinder is divided by a horizontal plane including the axis thereof into an upper portion and a lower portion, means for driving said cylinder, means for covering at least the upper portion of said cylinder, means for loosening soil mounted on and extending downwardly from said main support frame rearwardly of said cylinder, support means located rearwardly of said means for loosening the soil, means for breaking up clods of loosened soil mounted on said support means rearwardly of said means for loosening soil, said flail-blade cylinder arranged to pick up organic material covering the ground, to comminute the material and to throw it in the rearward direction onto the loosened soil over which the implement passes, wherein the improvement comprises that said means for covering said cylinder comprises a covering hood extending around the upper portion of said cylinder between said side supports from forwardly of the front side of the cylinder toward the rear side thereof with the rear end of said hood terminating in front of said rear end support with said covering hood extending so that in combination with said flail-blade cylinder the organic material located between said hood and cylinder is conveyed along a path oblique to the surface over which the implement travels, said covering hood comprising an arcuately shaped front part approximately concentrically arranged relative to the axis of said cylinder and rigidly connected to said main support frame, and a rear part hinged to the rear end of said front part and extending rearwardly therefrom and being in the form of a flap, said rear part is movable relative to said main support frame, said rear part being adjustably positionable around the hinge connection with said front part and being lockable in the adjusted positions for selectively directing in the rearward direction relative to said means for loosening soil and to said means for breaking up clods of loosened soil the organic material acted on by said cylinder, said main support being rectangularly shaped, said front end support of said main support frame supporting a headstock for a power lift device on a tractor, said headstock including a gearing with at least one lateral and one rear power take-off shaft, said cylinder being driven by said lateral power take-off shaft and said means for breaking up the soil being driven by said rear power take-off shaft, said means for breaking the soil comprises a frame, at least two drawbars rigidly atrached to said frame and pivotally connected to said main frame, and a pair of vertically extending adjusting spindles connected to said frame for vertically adjustably positioning said frame.

6. Agricultural implement, as set forth in claims 4 or 5, wherein said flap-like rear part being hinged to said front part above and forwardly of the axis of rotation of said cylinder so that said rear part can be pivoted upwardly into a position extending obliquely upwardly over said rear end support supporting said means for loosening soil and over said means for breaking up clods of loosened soil.

7. Agricultural implement, as set forth in claim 6, wherein said covering hood comprises lateral housing walls extending in the direction of said side supports so that said covering hood in combination with said walls forms a laterally enclosed housing over said cylinder, means supporting said housing in the operating position for adjusting the height of the housing formed by said covering hood and lateral walls over which the surface on which the implement travels.

8. Agricultural implement, as set forth in claim 7, wherein said means for adjustably positioning the housing comprises feeler wheels.

9. Agricultural implement, as set forth in claim 7, wherein said means for adjustably positioning the housing comprises skids supported on the surface over which the implement travels.

10. Agricultural implement, as set forth in claims 4 or 5, wherein said covering hood comprises at least two parts, said at least two parts comprising a front part extending concentrically of the axis of said cylinder and located forwardly and extending upwardly above said cylinder, and a rear part pivotally connected to said front part concentrically relative to the axis of said cylinder and said rear part being telescopically slidably mounted for movement forwardly over said front part.

11. Agricultural implement, as set forth in claims 4 or 5, wherein said means for loosening soil comprising vertically extending members supported on said main support frame and located rearwardly of said cylinder said members having a front edge facing in the forward direction of the agricultural implement having a knife-like construction and a part connected to and extending forwardly of said front edge of said member with the forward edge of said part being circularly concave and extending forwardly from said member to a location closely spaced rearwardly from the path of movement of said flail-blades on said cylinder.

12. Agricultural implement, as set forth in claims 4 or 5, wherein means for introducing material into the loosened soil being located rearwardly of said means for breaking the soil.

13. Agricultural implement, as set forth in claims 4 or 5, wherein fastening means mounted on said main support frame, an additional superstructure motor secured to said main support frame by said fastening means and said superstructure motor having power transmission means thereon for effecting the separate drive of said cylinder and said means for loosening soil.

* * * * *